United States Patent [19]

Hamada et al.

[11] Patent Number: 4,720,721
[45] Date of Patent: Jan. 19, 1988

[54] FILM WIND-UP CONTROL APPARATUS FOR A CAMERA

[75] Inventors: Hisashi Hamada, Tokyo; Katsuhiko Yamamoto, Saitama; Takeshi Yoshino, Saitama; Masayoshi Hirai, Saitama; Shiro Hashimoto, Saitama; Michihiro Shiina, Saitama; Shigenori Goto, all of Saitama, Japan

[73] Assignee: Fuji Photo Film Co., Ltd., Kanagawa, Japan

[21] Appl. No.: 13,871

[22] Filed: Feb. 12, 1987

[30] Foreign Application Priority Data

Feb. 12, 1986 [JP] Japan .................................. 61-28705
Feb. 12, 1986 [JP] Japan .................................. 61-28706

[51] Int. Cl.$^4$ ............................ G03B 1/12; G03B 1/60
[52] U.S. Cl. ................................ 354/173.11; 354/212; 354/217
[58] Field of Search ................. 354/173.1, 173.11, 212, 354/217

[56] References Cited

U.S. PATENT DOCUMENTS 3,854,142  12/1974  Whitley et al. ................. 354/173.11

Primary Examiner—Michael L. Gellner
Attorney, Agent, or Firm—Young & Thompson

[57] ABSTRACT

A film wind-up control apparatus of a camera in which a film is transported in zigzag direction passing around at least a guide roller located before an exposure station, is adapted to advance the film a predetermined length of the film when an exposure is made in a predetermined period of time and an extra length in addition to the predetermined length after the predetermined period of time has elapsed, so as to advance that part of the film which was previously positioned around the guide roller, beyond the exposure station. The apparatus is also adapted to indicate the number of possible exposures with one decrement every other occurrence of the extra length of film advance. In this way, film that has become permanently curled around the guide roller never comes to rest in the exposure station; but at the same time, the count of remaining frames is kept accurate.

7 Claims, 3 Drawing Figures

FILM WIND-UP CONTROL APPARATUS FOR A CAMERA

BACKGROUND OF THE INVENTION

The present invention relates to a film wind-up control apparatus for a camera which can controllably change the length of film to be transported each exposure, and more particularly to a film wind-up control apparatus for a camera which can count down the remaining exposures of a film in the camera according to the change in length of film to be transported.

Cameras, in particular middle-size or large-size cameras for use with wide films, must be made as compact as possible and must give a loaded film the proper tension so as to keep it flat during exposure. For this, there are provided in such cameras a pair of guide rollers so arranged as to guide the film in a zigzag path from a film supply spool to a film take-up spool. In this zigzag path, the film turns sharply about the guide rollers, which have a small diameter. If the film is left in the camera for a long time, the film is apt to develop a permanent curl around the guide rollers. If the permanently curled part of the film is placed in the exposure area, it is hard to flatten it. As a consequence, it often happens that when the camera is left unused for a long period of time, there will be a poorly focused image on the film.

For this reason, if a part of the film is permanently curled, it is desirable to advance this part of the film out of the exposure station of the camera in order to avoid taking a poorly focused picture due to the curled film.

Because the length of the film is fixed, and in the normal case there is a predetermined number of exposures, when the film is occasionally advanced a distance greater than a normal frame, the remaining possible number of exposures left on the film will be changed. As is well known in the photographic art, cameras are provided with exposure counters, which are, however, incapable of indicating the actually remaining possible number of exposures on a film loaded in the camera. When the number of possible exposures indicated is different from the actual number of possible exposures on the film in the camera, there will be difficulties at the end of the roll of film.

OBJECTS OF THE INVENTION

It is, therefore, an object of the invention to provide a film wind-up control apparatus of a camera which can prevent a curled portion of film from being exposed.

It is another object of the present invention to provide a film wind-up control apparatus of a camera which can controllably change the length of film to be transported each exposure so as to avoid positioning permanently curled film in the exposure station of the camera.

It is still another object of the present invention to provide a film wind-up control of a camera which can indicate the actual number of possible exposures of a film loaded in the camera even though the length of film to be transported is changed.

SUMMARY OF THE INVENTION

According to the present invention, the film wind-up control apparatus of a camera comprises film transporting means for transporting a film a predetermined length each exposure from a film supply spool to a film take-up spool in a zigzag direction around at least one guide roller located upstream of an exposure station. Means are provided for detecting a predetermined duration of tie after every exposure, as well as controlling means for controlling the film transporting means to transport the film more than the predetermined length upon the detection of the predetermined duration of time so as to bring part of the film previously positioned around the guide roller through and past the exposure station.

In accordance with a feature of the present invention, the controlling means comprises a pulse-producing device for producing pulse signals the number of which is in proportion to the number of rotations of the guide roller resulting from the transportation of the film, a pulse counter for counting the pulse signals, and a device for stopping the film transporting means upon a predetermined number of the pulse signals being counted. When the detecting means detects the predetermined duration of time, another predetermined number of pulse signals to be counted is automatically changed so as to cause the film transporting means to transport the film more than the predetermined length of film, thereby to move the part of the film previously positioned around the guide roller past the exposure station.

In accordance with another feature of the present invention, there is provided means for indicating the number of possible exposures of the film loaded in the camera. This indicating means can reduce its indicated number when the predetermined duration of time has been detected more than one time, namely when the film has been transported an increased distance more than one time.

BRIEF DESCRIPTION OF THE DRAWINGS

The invention will now be illustratively described in further detail, in reference to the accompanying drawings, in which.

DETAILED DESCRIPTION OF THE INVENTION

A film wind-up control apparatus according to a preferred embodiment of the present invention is incorporated in a large format still picture camera. Because such cameras are well known in the art, this description will be directed in particular to elements forming part of or cooperating directly with apparatus embodying the present invention. It is to be understood that camera elements not specifically shown or described may take various forms known to those skilled in the art.

It is to be noted that like parts are designated by like numerals and symbols throughout the several views of the accompanying drawings.

Figure 1:
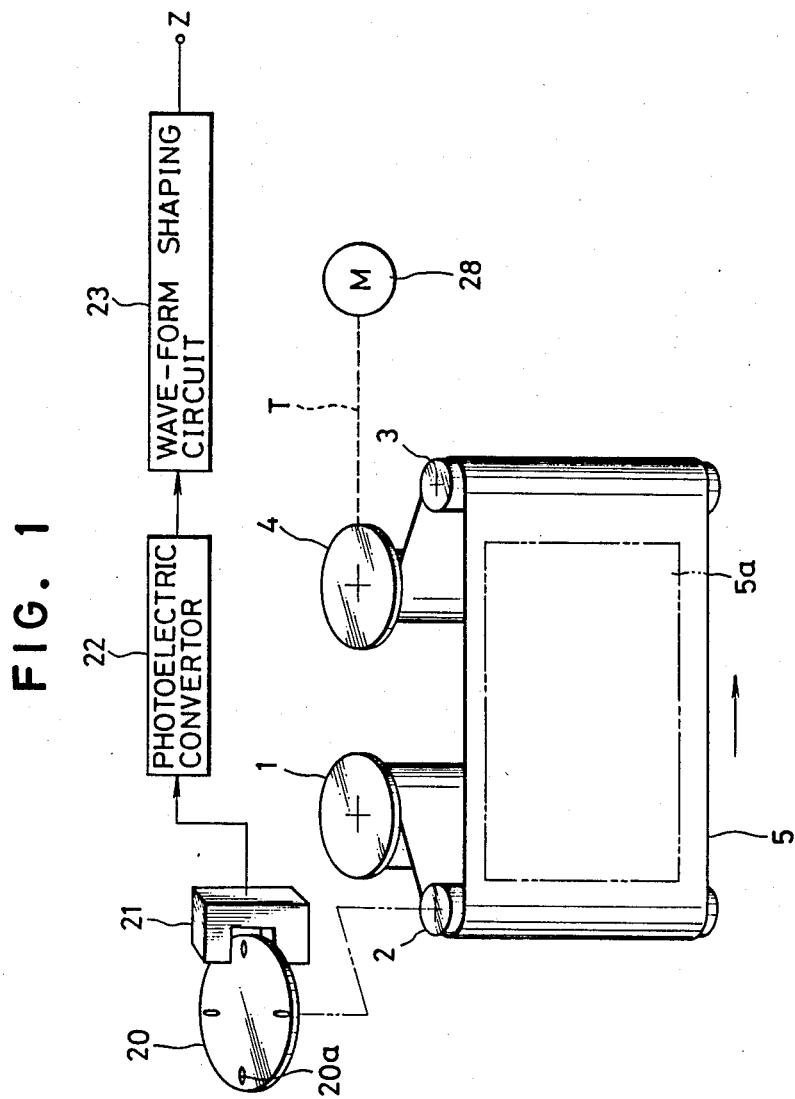
FIG. 1 is a schematic perspective view, partly shown in block diagram, of a film wind-up mechanism.
Figure 2:
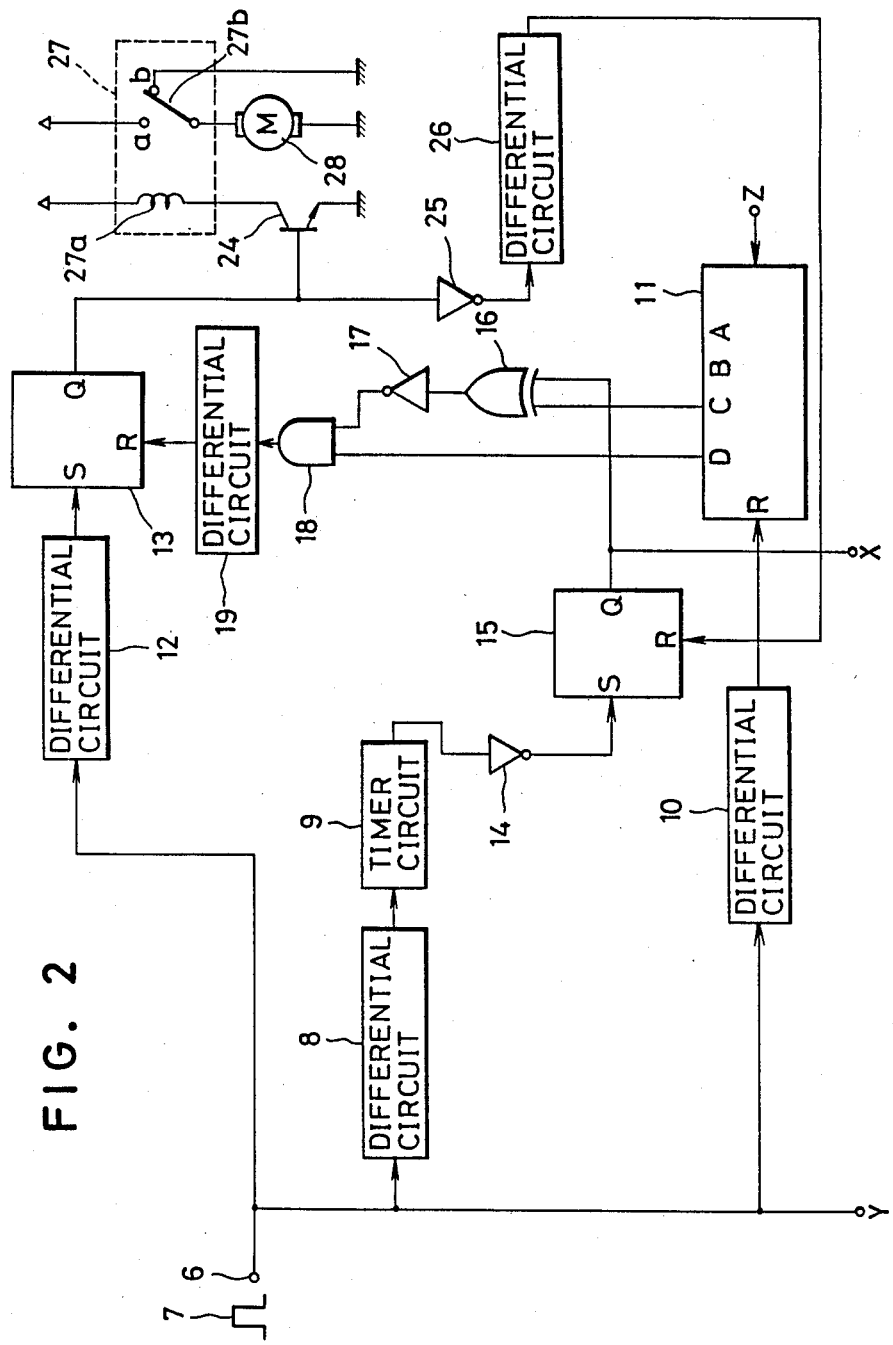
FIG. 2 is a circuit diagram showing the film wind-up control apparatus of the present invention.
Figure 3:
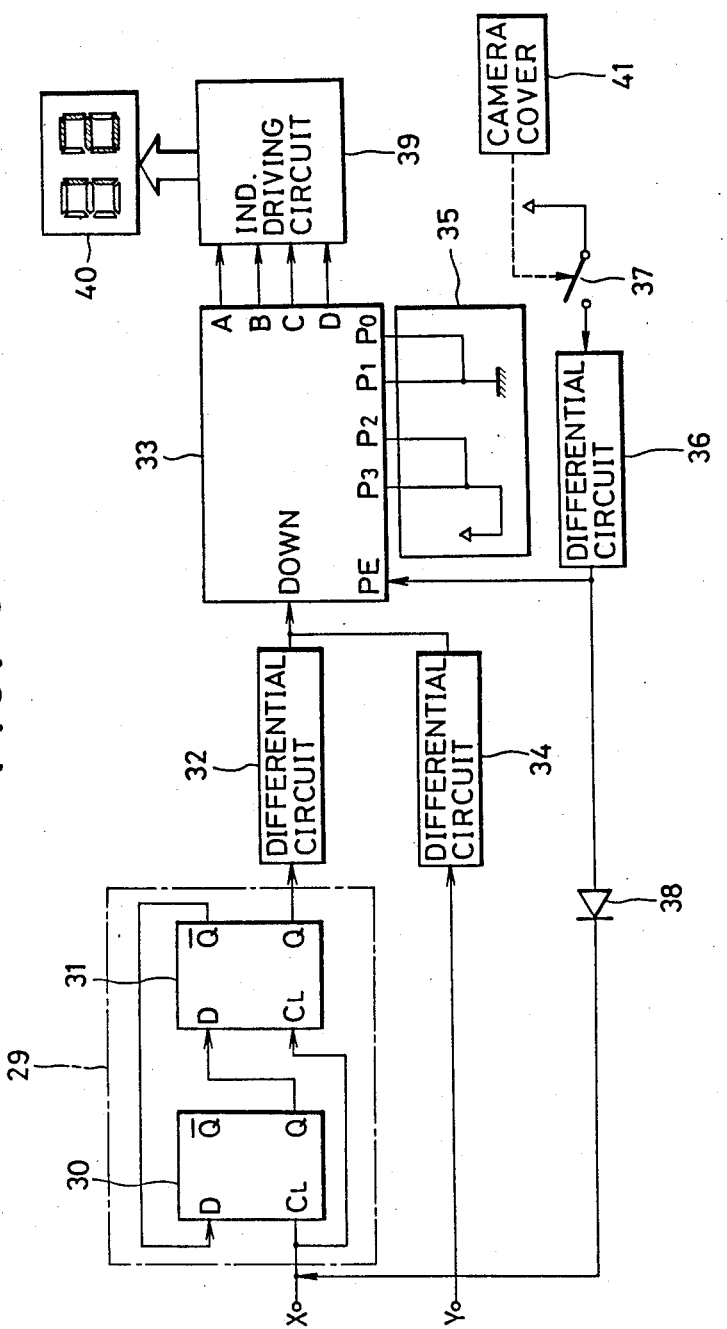
FIG. 3 is a circuit diagram showing an exposure number indicating device of a part of the present invention.

FIG. 1 is a schematic, perspective view of a film wind-up mechanism with which the film wind-up control apparatus of this invention shown in FIGS. 2 and 3 is associated. In FIG. 1, there are provided in a camera body a film supply and a film take-up spool 1, 4 between which a film passage is formed in any well known form. In the film passage, there are a pair of guide rollers, namely first and second guide rollers 2 and 3 disposed on both sides of an exposure station 5a. A film 5, for example a brownie size of film, is transported along a zigzag path from the film supply spool 1 to the film take-up spool 4 while being deflected about the pair of guide rollers 2 and 3. As shown in FIG. 1, the pair of guide rollers 2 and 3 are so disposed as to leave a space therebetween wider than that between the guide spools 1 and 4. Because the film 5 in the film passage is in tension between the spools 1 and 4, and the guide rollers 2 and 3, and bends sharply about the later, a permanent curl occurs in the film 5 around the guide rollers 2 and 3 if the film 5 is left intact in the camera for a long time. Consequently, when advancing the film 5 by one frame in the direction shown by an arrow after having left it intact for a long time, the permanently curled part of the film 5 that was in contact with the first guide roller 2 is moved into the exposure station 5a. As a result, the film 5 cannot be held flat in the exposure station 5a, resulting in a defocused image on the film 5 and, therefore, in a blurred image on a print.

According to the present invention, for preventing the permanently curled part of the film 5 from stopping in the exposure station 5a, there is provided a film wind-up control apparatus that can control the film wind-up mechanism.

Referring now to FIG. 2, there is shown this novel control film wind-up apparatus, comprising an input terminal 6 to which a film wind-up signal 7 is supplied each exposure. The film wind-up signal 7 can be provided in association with, for example, the operation either of a shutter release button or of a shutter mechanism in any known manner. The input terminal 6 is connected to a timer circuit 9, a binary counter 11 at its reset terminal R, and a flip-flop 13 at its set terminal S, each through a respective differential circuit 8, 10, 12, and further to a terminal Y. The timer circuit 9 is adapted to provide normally a high level H of output and a low level L of output after a predetermined period of time, and to repeat its reset and time-count operation each time the film wind-up signal 7 is supplied to the input terminal 6. Therefore, if in fact there is no film wind-up signal 7 at the input terminal 6 in the predetermined period of time, the output of the timer circuit 9 turns to and is maintained at the low level L. The predetermined period of time is experimentally determined depending on the time in which a permanent curl is certain to occur in the film 5 that is bent around the guide roller 2, with due regard to ambient temperature, the diameter of the guide roller 2, and so on. Therefore, this period of time is usually long, for example 12 hours, 24 hours or even more. The timer circuit 9 at its output terminal is connected, through an inverter 14, to a set terminal S of a flip-flop 15 whose output terminal Q is connected to one of input terminals of Ex-OR gate 16 as well as to a terminal X. The flip-flop 15 provides at its output terminal Q an output which is rendered low level L during the time the timer circuit 9 provides its high level output, and becomes high level H upon the output from the timer circuit 9 falling to its low level L.

The Ex-OR gate 16 at its another input terminal is connected to one of the four-bit parallel output terminals A to D, namely the output terminal C, of the binary counter 11. At its output terminal the Ex-OR gate 16 is connected, through an inverter 17, to AND gate 18 at its one input terminal whose another input terminal is connected to the output terminal D of the binary counter 11. The AND gate 18 at its output terminal is connected, through a differential circuit 19, to the flip-flop 13 which is reset by the presence of a high level output H at the output terminal of the AND gate 18.

The binary counter 11 has a data input terminal Z which is supplied with a pulse train produced by a pulse-producing device associated with the film wind-up mechanism shown in FIG. 1. This pulse-producing device comprises a rotary disk 20 having a plurality of small holes 20a arranged at regular angular spaces, and a photo-interrupter 21 with its associated circuits 22 and 23. Although there is shown no linking mechanism between the guide roller 2 and the rotary disk 20, they are operationally connected to each other in any well known manner so as to provide a proportional rotation therebetween. The photo-interrupter 21 can detect the small holes 20a of the rotary disk 20 when disk 20 rotates as a result of the rotation of the guide roller 2 during film advance, to produce light pulses which in turn are transformed into an electric pulse train through the photoelectric converter 22 and the wave-form shaping circuit 23 which is well known per se, and then transmitted to the above-mentioned terminal Z. In this embodiment, the pulse-producing device is adapted to provide eight electric pulses for every single-frame advance of the film 5. It can be assumed that, when transporting the permanently curled part of the film 5 from around the guide roller 2 past the exposure station 5a and to the guide roller 3, it is required to advance the film 5 by a length corresponding to, say, 12 electric pulses.

The binary counter 11 is adapted to make its output logic "1" (which is of high level H) at the terminal D and logic "0" (which is of low level L) at the remaining terminals A, B and C when counting up right electric pulses, but logic "1" at the terminals C and D, the logic "0" at the remaining terminals A and B when counting up 12 electric signals.

The flip-flop 13 whose reset terminal S is connected to the AND gate 18 through the differential circuit 19 has its output terminal Q connected to the base of a transistor 24 as well as to the reset terminal R of the flip-flop 1t through an inverter 25 and a differential circuit 26. The transistor 24 has its collector connected to a power line (not shown) through a relay coil 27a which is a part of a relay 27 and a grounded emitter. The relay 27 has a contact member 27b with selective contacts a and b, and a common contact connected to a power input terminal of an electric motor 28 for winding up the film 5. The contact a is connected to the power line and the contact b is grounded. The relay 27 selects the contact b when the relay coil 27a is deenergized and, on the other hand, the contact a when the relay coil 27a is energized. The motor 28 whose other power input terminal is grounded is operationally coupled to the film take-up spool 4 through a gear train T well known in the art per se so as to rotate it for winding up the film 5.

FIG. 3 shows an exposure counter which is a part of the film wind-up control apparatus in which terminals denoted by X, Y are the same as the terminals X, Y in FIG. 2. In FIG. 3, there is a two-pulse counter 29 comprising a preceding and a subsequent flip-flop 30, 31. The clock terminal CL of each flip-flop 30, 31 is connected to the terminal X. The data terminal D and the output terminal Q of the preceding flip-flop 30 are connected to the output terminal $\overline{Q}$ and the data terminal D of the subsequent flip-flop 31, respectively. In the two-pulse counter 29, every other time a pulse of high level H appears at the terminal X, the flip-flop 31 renders the output at the terminal Q high level H which in turn is transmitted to a down counter 33 at its count-down terminal DOWN through a differential circuit 32. The count-down terminal DOWN is connected to the terminal Y also through a differential circuit 34.

This down counter 33, which is a presettable binary counter, has four present terminals P0 to P3 to receive present data signals provided by a wiring pattern 35. This wiring pattern 35, which is disposed in the camera, is adapted to provide fixed present data of the exposure number of the film 5. On the camera there is a switch 37 which is closed upon closing a camera cover 41 to provide a trigger pulse signal which in turn is applied to the down counter 33 at its terminal PE to allow it to receive the present data through the present terminals P0 to P3. In this embodiment, the closing of the camera cover 41 causes the preset terminals P0 and P1 to take logic "0" (low level L), and the terminals P2 and P3 to take logic "1" (high level H), setting the down counter 33 to the preset data. The preset enable terminal PE is connected through a differential circuit 36 to the switch 37 which is closed by closing the camera cover 41. Therefore, the down counter 33 actually sets its preset data to the number of possible exposures, for example 12 exposures when the film 5 is of the brown the type, only when the camera cover 41 is closed. The trigger pulse signal from the switch 37 is also transmitted, through the differential circuit 36 and a diode 38, to the terminal X.

The down counter 33 also has four-bit parallel output terminals A to D connected to a driving circuit 39 for a liquid crystal display device 40. This display device 40 can indicate the contents of the down counter 33.

A further understanding of the operation of the film wind-up control device of the present invention will be had from the following description.

When the camera cover 41 is closed after having loaded the film in the camera, the switch 37 is closed to provide a preset signal which in turn is transmitted, as a pulse signal, to the present enable terminal PE of the down counter 33 so as to allow the down counter 33 to preset the data, namely the number of possible exposures of the film 5 therein. The preset data, the number 12, in this embodiment, is displayed on the indicator 40 through the driving circuit 39. At the same time, the pulse signal is also transmitted to the terminal X so as to change the output of the preceding flip-flop 30 at the terminal Q to a high level H.

As a result of an exposure operation, a film wind-up signal is presented at the input terminal 6. If the exposure operation is performed within the predetermined period of time after the previous one, the film wind-up signal 7 resets the timer circuit 9 to its initial condition so as to allow it to maintain its output at a high level H. Consequently, the flip-flop 15 maintains its output at the terminal Q at a low level L.

The film wind-up signal 7 is also transmitted to the binary counter 11 at its reset terminal R through the differential circuit 10 to reset it as well as to the flip-flop 13 at its set terminal S to set it up. As a result, the output from the flip-flop 13 changes to a high level H so as to render the transistor 24 conductive, energizing the relay coil 27a to change over the contact member 27b from the contact b to the contact a, thereby to cause the electric motor 28 to rotate. The rotation of the motor 28 causes the take-up spool 4 to rotate through its associated gear train T so as to advance the film 5 in the direction shown by an arrow in FIG. 1. As this film advance is followed by a rotation of the guide roller 2, and hence the rotary disk 20 in association with the guide roller 2, the photo-interrupter 21 detects the small holes 20a of the rotary disk 20 of a number in proportion to the transported length of the film 5 to produce the corresponding number of light pulses which in turn are converted and transformed into a train of electric pulses through the photoelectric converter 22 and the wave-form shaping circuit 23. As was previously described, the train of electric pulses is transmitted to the binary counter 11 and counted up thereby. The binary counter 11, when counting up eight electric pulses, changes its outputs at the output terminals C and D to a low level L and a high level H, respectively. As a consequence, both inputs of the AND gate 18 change to a high level H, and a reset signal is supplied to the flip-flop 13 at its reset terminal R through the differential circuit 19. Therefore, the output from the flip-flop 13 at its output terminal Q changes to a low level L, causing the transistor 24 to become nonconductive so as to deenergize the relay coil 27a. Thereby, the contact member 27b is changed over from the contact a to the contact b to stop the motor 28, completing a one-frame advance of the film 5. At the same time, the output of a low level L from the flip-flop 13 is supplied to the flip-flop 15 at its reset terminal R through the inverter 25 and the differential circuit 26 to reset it to its initial state.

The film wind-up signal 7 presented at the terminal 6 is supplied to the down counter 33 at its input terminal DOWN through the differential circuit 34 so as to cause it to count down one. As a consequence, the driving circuit 39 causes the display device 40 to indicate the result, which is decreased one from the previously indicated value.

If there is no film wind-up signal 7 at the terminal 6 for the predetermined period of time after the previous exposure operation, the timer 9 changes its output to a low level L at the end of the predetermined period of time. Consequently, the output of the flip-flop 15 is changed to and maintained at a high level H.

In the condition wherein the output of the flip-flop 15 at its output terminal Q is maintained at a high level H, when another exposure is made to present a film wind-up signal 7 at the terminal 6, the motor 28 starts its rotation to advance the film 5, producing a train of electric pulses which is counted up by the binary counter 11. Although the binary counter 11 counts eight pulses to change its outputs at the terminals C and D to a low and a high level, respectively, nevertheless, because of the high level H of output at the output terminal Q of the flip-flop 15, and hence the high level H of output of the Ex-OR gate 16, the output of the AND gate 18 is of a low level L. Therefore, the flip-flop 13 is supplied with no reset signal. As a result, the motor 28 continues to rotate in spite of the one-frame film advance. When the binary counter 11 counts 12 pulses, it changes the output at the terminals C and D to a high level H so as to cause the AND gate 18 to provide an output of high level H which in turn is supplied as a rest signal to the reset terminal R of the flip-flop 13. Consequently, the flip-flop 13 changes its output at the output terminal Q to a low level L to stop the motor 28. At the same time, the flip-flop 15 is caused by the output of low level L from the flip-flop 13 to change its output at the terminal Q to a low level L. As will be apparent, this means that the film 5 is advanced excessively by a length corresponding to four pulses to move the permanently curled part of the film 5 beyond the exposure station 5a. Therefore, the film 5 in the exposure station 5a is held flat and ready for another exposure.

By the leading edge of the output from the flip-flop 15, the output of the preceding flip-flop 30 at its terminal Q, which was previously maintained at a high level H, is changed to a low level L, and consequently the output of the subsequent flip-flop 31 at its terminal Q is changed to a high level H which in turn is supplied to the down counter 33 at its input terminal DOWN. As a result, the indicator 40 decreases its indication by one independently of the application of film wind-up signal 7. When the excessive film advance is effected once again, the output at the terminal Q is then changed to a high level H for the preceding flip-flop 30 and to a low level L for the later flip-flop 31. Therefore, the down counter 33 is supplied with no signals, and maintains its previous indication unchanged. However, the third repetition of excessive film advance is effected, then the down counter is supplied with a signal to be counted down and decreases its previous indication by one. This means that the down counter 33 causes the indicator 40 to change its indication by one decrement every other excessive film advance or every odd excessive film advance.

In this embodiment, if a normal one-frame film advance is effected by eight pulse signals and an extra four pulse signals are used to advance the permanently curled part of the film beyond the exposure station 5a, and if the film 5 has initially 12 exposable frames, the 12th frame is halved in exposable area when the first excessive film advance has been made, and disappears when the second excessive film advance has been made. That is, the last frame of the film is halved in its exposable area every excessive film advance and one decrement in the indicated possible exposure number of the indicator is made very other excessive film advancement.

It should be noted that, in place of the wiring pattern which is adapted to provide fixed preset data, means can be incorporated in the camera for providing different preset data if the camera can use different possible exposure numbers of films. This means may comprise, for example, a plurality of dip switches connected to the respective preset terminals P0 to P3. It should be also noted that this invention is applicable to cameras which are used with interchangeable film magazines with a camera cover. In this case, the film magazine should be constructed as a part of the camera body.

The invention has been described in detail with reference to a specific embodiment; however it will be recognized by those skilled in the art that various modifications of the invention are possible within the spirit and scope of the following claims.

What is claimed is:

1. A film wind-up control apparatus of a camera wherein a film is advanced from a film supply spool to a film take-up spool through an exposure station of said camera, said film advance being in a zigzag direction passing around at least a guide roller located before said exposure station, said apparatus comprising:
   means for exposing said film;
   means for advancing said film every operation of said exposing means;
   time measuring means for detecting the passage of a predetermined period of time and which is adapted to repeat the time measurement every operation of said exposing means;
   means for controlling said film advancing means to advance said film a predetermined length before said time measuring means detects aid predetermined period of time and to advance said film in addition a predetermined extra length after having detected the passage of said predetermined period of time so as to move the part of said film which was previously positioned around said guide roller beyond said exposure station.

2. An apparatus as defined in claim 1, wherein said controlling means comprises a device for detecting said predetermined length of said film and a device for disabling said film advancing means upon the detection of said predetermined length of said film.

3. An apparatus as defined in claim 2, wherein said detecting device comprises a pulse-producing device adapted to produce pulse signals of a number proportional to an advanced length of said film, and means for counting said pulse signals.

4. An apparatus as defined in claim 2, in which said detecting device is associated with said guide roller.

5. An apparatus as defined in claim 2, wherein said detecting device includes a binary counter which is changeable in countable number before and after the detection of said predetermined period of time.

6. A film wind-up control apparatus of a camera wherein a film is advanced from a film supply spool to a film take-up spool through an exposure station of said camera, said film advance being in a zigzag direction passing around at least a guide roller located before said exposure station, said apparatus comprising:
   means for indicating the possible number of exposures of said film;
   means for advancing said film when an exposure is made;
   time measuring means for detecting a predetermined period of time and which is adapted to repeat the time measurement every exposure;
   means for controlling said film advancing means to advance said film a predetermined length before said time measuring means detects the passage of said predetermined period of time and to advance said film in addition a predetermined extra length after having detected the passage of said predetermined period of time so as to move the part of said film which was previously positioned around said guide roller beyond said exposure aperture; and
   means for decreasingly changing said possible exposure number of said film indicated on said indicating means at intervals of a plurality of said predetermined extra lengths of film advance.

7. An apparatus as defined in claim 6, wherein said decreasing change of said indicated number of possible exposures is made every other said predetermined extra length of film advance.

* * * * *